United States Patent [19]

Miyake et al.

[11] Patent Number: 5,173,890
[45] Date of Patent: Dec. 22, 1992

[54] OPTICAL PICKUP DEVICE INCLUDING DIFFRACTION GRATING

[75] Inventors: Takahiro Miyake; Yoshio Yoshida; Yukio Kurata, all of Tenri, Japan

[73] Assignee: Sharp Kabushiki Kaisha, Osaka, Japan

[21] Appl. No.: 687,478

[22] Filed: Apr. 18, 1991

[30] Foreign Application Priority Data

Apr. 20, 1990 [JP] Japan ................................ 2-105937

[51] Int. Cl.$^5$ .............................................. G11B 7/09
[52] U.S. Cl. ............................. 369/44.23; 369/44.41; 369/112
[58] Field of Search ............... 369/44.23, 44.24, 44.41, 369/44.42, 109, 111, 112, 120; 359/569, 571, 576

[56] References Cited

U.S. PATENT DOCUMENTS

| 4,983,017 | 1/1991 | Tsuji et al. ..................... 369/109 X |
| 5,066,138 | 11/1991 | Toide et al. ........................ 369/112 |
| 5,111,448 | 5/1992 | Komma et al. .................. 369/44.23 |
| 5,111,449 | 5/1992 | Kurata et al. ................... 369/112 X |

FOREIGN PATENT DOCUMENTS

| 0266841 | 5/1988 | European Pat. Off. . |
| 0320276 | 6/1989 | European Pat. Off. . |
| 0336737 | 10/1989 | European Pat. Off. . |
| 0357323 | 3/1990 | European Pat. Off. . |
| 0457573 | 11/1991 | European Pat. Off. . |
| 62-248139 | 10/1987 | Japan . |

Primary Examiner—Wayne R. Young
Attorney, Agent, or Firm—David G. Conlin

[57] ABSTRACT

An optical pickup device having an optical system provided with at least a light source, a shaping prism, a diffracting element and a photodetector. The light source projects light whose intensity distribution has an elliptical shape in its cross section orthogonal to the optical axis. The shaping prism directs the light to a recording medium after shaping the intensity distribution thereof into a circular shape. The diffracting element has diffraction regions formed by at least one division line substantially parallel to a reference direction. The light reflected from the recording medium forms an elliptical bright portion on the diffracting element. The photodetector is divided by a plurality of division lines, at least one of which is substantially parallel to the reference direction. The diffracting element diffracts the reflected light so as to converge it on the photodetector. Have, a hypothetical line extending from a projecting point of the light source through the center of a light-receiving face of the photodetector is also set to be parallel to the reference direction. For example, when the shaping prism is to shape the intensity distribution having the elliptical shape with respect to its minor axis direction, the optical system is arranged so that the minor axis of the bright portion is parallel to the division line of the diffracting element. Thus, it is possible to always obtain an accurate focusing control signal.

9 Claims, 6 Drawing Sheets

REFERENCE DIRECTION

OPTICAL PICKUP DEVICE INCLUDING DIFFRACTION GRATING

FIELD OF THE INVENTION

The present invention relates to an optical pickup device for use in optical recording-reproduction apparatuses.

BACKGROUND OF THE INVENTION

Optical pickup devices are well known to the art, which records and reproduces information by applying light beams to a recording medium such as an optical disk. In a commonly used optical pickup device, light beams projected from a semiconductor laser as a light source are passed through a diffracting element, and form a parallel pencil of light beams through a collimating lens. An intensity distribution of the parallel pencil of light beams shows an elliptical shape in its cross section orthogonal to the optical axis, according to the intensity distribution of the light beams projected from the semiconductor laser. In addition, such an intensity distribution of light related to a cross section orthogonal to the optical axis, is hereinafter referred to simply as the intensity distribution. The elliptical intensity distribution is shaped into a substantially circular shape by a shaping prism in order to improve the efficiency of light utilization in the optical pickup device. The light beams having their intensity distribution shaped into the substantially circular shape, are focused on the recording medium by an object lens.

The light beams reflected from the recording medium (hereinafter referred to simply as the reflected beams) follow a light path in a reversed manner to the above-mentioned, and have their intensity distribution restored to be elliptical by passing through the shaping prism. Thereafter, the reflected beams are directed to a diffracting element via the collimating lens, and diffracted by the diffracting element so as to be focused on a photodetector.

Normally, each of the diffracting element and the photodetector is divided into a plurality of regions by a plurality of division lines so as to obtain a focus error signal or a tracking error signal by adopting the knife-edge method or push-pull method. For example, in accordance with the knife-edge method, a focus error signal can be obtained by finding a difference of detecting signals released from two detecting regions adjacent to each other in the photodetector.

FIG. 7 is one example of the FES curve showing the relationship between the intensity of the focus error signal thus obtained and the amount of the displacement of the optical disk based on the focal point of the object lens taken as a reference. In FIG. 7, a reference point A represents a case without a focus error. A converging point of the reflected beams diffracted toward the photodetector by the diffracting element varies in its position in front of or behind the photodetector in response to fluctuations of the recording medium. As a result, since a shape of a light spot formed on the photodetector by the reflected beams is reversed, the value of the focus error signal is reversed from positive to negative in accordance with the amount of the displacement of the recording medium.

In this case, as shown in FIG. 7, when the recording medium moves away from the focal point of the object lens to a certain extent, an undesired zero-cross point B appears on the FES curve at a position other than the reference point A. Especially in an optical pickup device using a shaping prism in its optical system, an undesired zero-cross point may appear within a dynamic range of focusing control, depending on what arrangement is selected with respect to the optical system. This is related to the fact that the fluctuation of the recording medium causes the shaping prism to have astigmatism.

Meanwhile, the zero-cross point in the FES curve provides a drive target for the object lens in focus servo control, and if a zero-cross point B appears at a position other than the reference point A as described above, the following problems arise. When focusing control is performed so as to move the object lens from a farther position toward a closer position with respect to the optical disk, for example, in the case of occurrence of an excessive focus error due to an external cause or an initial state of the device, the object lens might be moved to focus on the undesired zero-cross point B. As a result, normal information recording or reproduction might not be performed.

SUMMARY OF THE INVENTION

It is an object of the present invention to provide an optical pickup device wherein focusing control for converging light on a recording medium according to a focus error signal is always performed accurately.

It is another object of the present invention to provide an optical pickup device wherein a zero-cross point of the focus error signal indicates only a state where there is no focus error.

It is still another object of the present invention to provide an optical pickup device wherein alleviated tolerances are available for the installation position of a diffracting element to be installed in the optical pickup device.

In order to achieve the above objects, the optical pickup device of the present invention is characterized in comprising at least the following means:

(1) light generation means (for example, a semiconductor laser) for generating light having the following features, (a) and (b):
  (a) having intensity distribution showing a substantially elliptical shape in the cross section orthogonal to the optical axis.
  (b) the minor axis of the above elliptical shape being parallel to a reference direction.

(2) intensity distribution shaping means (for example, a shaping prism) having the following shaping functions, (c) and (d), with respect to the intensity distribution of the light:
  (c) shaping the intensity distribution of the light, which is directed on a recording track formed on a recording medium, to form a substantially circular shape by having the intensity distribution of the elliptical shape diffused with respect to the minor axis.
  (d) shaping the intensity distribution of the light reflected from the recording track to restore its substantially elliptical shape, that is, a reversed function to the function (c).

(3) photodetecting means (for example, a photodetector) having the following features, (e), (f), (g) and (h):
  (e) including a plurality of photodetecting regions formed by a plurality of division lines dividing a light-receiving face.
  (f) being designed to obtain a focus error signal through detection signals released by the respective photodetecting regions according to the intensity of the light entered thereto.

(g) setting at least one of the plurality of division lines to be parallel to the reference direction.

(h) setting a hypothetical line extending through a projecting point of the light generation means and the center of the light-receiving face to be parallel to the reference direction.

(4) diffraction means (for example, a diffracting element) having the following features, (i), (j) and (k).

(i) including a plurality of diffraction regions formed by a plurality of division lines dividing a diffraction face.

(j) diffracting the reflected light having passed through the intensity distribution shaping means so as to converge it on the light-receiving face of the photodetecting means.

(k) setting at least one of the plurality of division lines for dividing the diffraction face to be parallel to the reference direction.

In the arrangement, when the reflected light that has been diffracted by at least one of the diffraction regions of the diffraction means is converged on at least one of the division lines in the photodetecting means, which is parallel to the reference direction, a value of the focus error signal is allowed to become zero.

Additionally, instead of the above arrangement shown by (1)-(b) and (2)-(c), another arrangement is adoptable, wherein the major axis of the elliptical shape is set to be parallel to the reference direction, and the intensity distribution shaping means is designed to have the intensity distribution of the elliptical shape condensed with respect to the major axis direction.

In the above arrangement, the light generation means projects light whose intensity distribution has an elliptical shape with its minor axis parallel to the reference direction, and at least one of the division lines of the diffraction means is set to be parallel to the reference direction. Thus, the reflected light directed to the diffraction means forms an elliptical bright portion whose major axis is orthogonal to the division line of the diffraction means. In this case, even if the division line of the diffraction means slightly deviates from the optical axis, or slightly tilts with respect to the reference direction, the function of the diffraction means for diffracting the reflected light so as to converge it on the photodetecting means is little adversely affected. Therefore, in the optical pick-up device in accordance with the present invention, tolerances in the installation position of the diffracting element are alleviated, and the installation work for the diffracting element is simplified.

Moreover, under the above-mentioned conditions, even if a bright portion having a line-like shape is formed on the diffracting element due to the astigmatism of the intensity distribution shaping means, the diffracted light can be directed to the photodetecting means. Therefore, a state where the value of the focus error signal shows zero, always indicates the fact that there is no focus error. As a result of this arrangement, accurate focusing control is always performed.

On the other hand, in the other arrangement described above, the light generation means projects light whose major axis of the elliptical shape is parallel to the reference direction, and further, the intensity distribution shaping means is designed to have the intensity distribution of the elliptical shape condensed with respect to the major axis direction. As the recording medium moves away from a position where there is no focus error, the focal distance of the reflected light having passed through the diffraction means becomes shorter. However, in this arrangement, the intensity distribution shaping means does not have an action to further condense the focal distance of the reflected light with respect to the direction of the minor axis. Therefore, unless the recording medium moves too far away from the position where there is no focus error, for example, as far as several millimeters therefrom, it is avoided that the reflected light forms a bright portion having a line-like shape on the diffraction means. The displacement of the recording medium in the order of several millimeters is virtually negligible in actual focusing control. Consequently, since occurrence of an zero-cross point undesirable for the focus error signal for use in the focusing control is avoided, focusing control is always performed accurately.

As described above, the optical pickup device of the present invention makes it possible to always perform a stable recording or reproducing operation.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic plan view of a diffracting element and a photodetector of FIG. 2, which are seen in the direction as indicated by arrows I—I.

FIG. 2 is a schematic front view of an optical pickup device.

FIG. 3 is a schematic plan view of the photodetector.

FIG. 5 is a schematic front view of an optical pickup device.

FIG. 6 is a schematic plan view of a diffracting element and a photodetector of FIG. 5, which are seen in the direction as indicated by arrows VI—VI.

DESCRIPTION OF THE EMBODIMENTS

Figure 1:
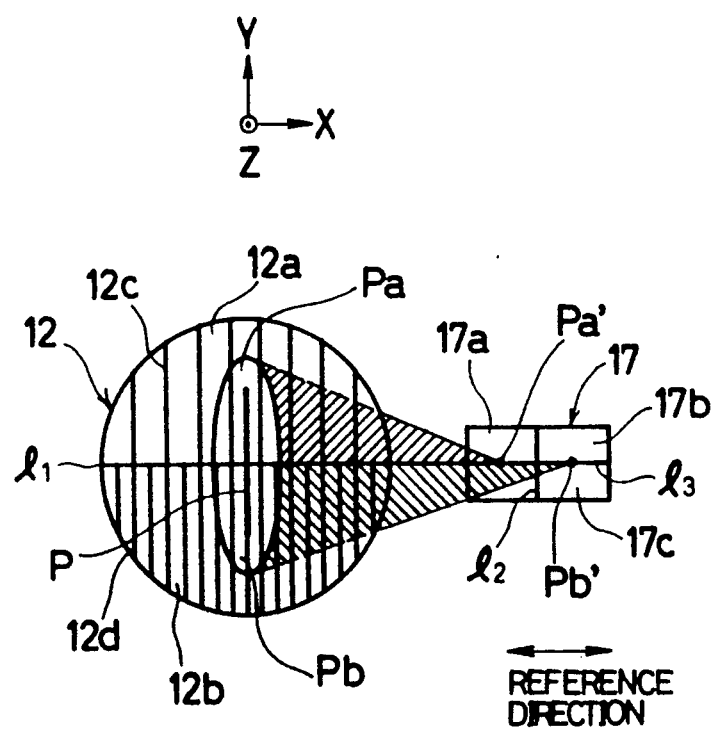
FIGS. 1, 2 and 3 show one embodiment of the present invention.
Figure 2:
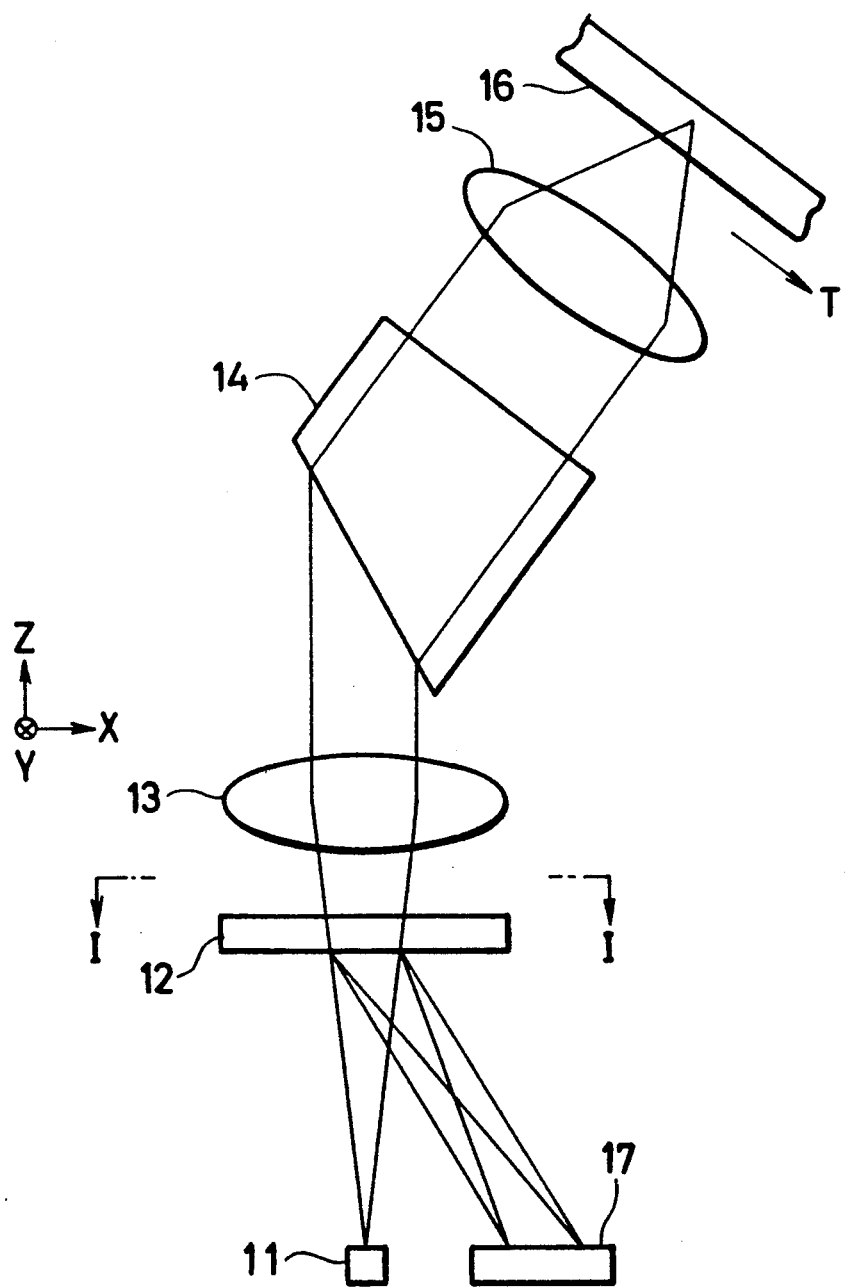
Figure 3:
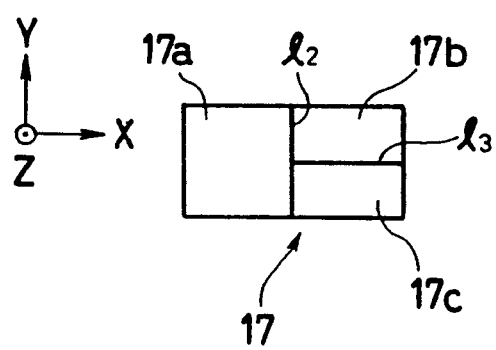

Referring to FIGS. 1, 2 and 3, the following description will discuss one embodiment of the present invention.

First, three axis rectangular coordinates are determined using X, Y and Z, as follows. As shown in FIGS. 1, 2 and 3, the Z-axis is determined to be parallel to an optical axis of light beams projected from a semiconductor laser 11. The X-axis is determined to be orthogonal to the Z-axis and further parallel to a hypothetical line extending through a projecting point of the semiconductor laser 11 and the center of a light-receiving face of a photodetector 17, while the Y-axis is determined to be orthogonal to both the X and Z-axes. The direction parallel to the X-axis is hereinafter referred to as a reference direction. Further, directions as indicated by arrows of the respective X, Y and Z axes in FIGS. 1, 2 and 3 are supposed to be the respective positive directions. In addition, an optical disk 16 is provided with recording tracks preformed thereon, for example, in the form of grooves, and a tangent direction T of a recording track at an illuminating point by the light beams in a recording or reproducing operation is set to be located within an X-Z plane, and further is orthogonal to the optical axis of an object lens 15 as is shown in FIG. 2.

The semiconductor laser 11 projects light beams whose intensity distribution show an elliptical shape in their cross section (X-Y plane) orthogonal to the optical axis (Z-axis). Here, the minor axis of the elliptical shape is parallel to the X-axis, that is, the reference direction, while the major axis is parallel to the Y-axis (Additionally, such intensity distribution of light, related to a cross section orthogonal to the optical axis, is hereinafter referred to simply as the intensity distribution.) The light beams having passed through a diffracting element 12 as diffraction means, enter to a collimating lens 13 to form a parallel pencil of light beams. Further, the intensity distribution of the light beams is shaped from its elliptical shape into a substantially circular shape by a shaping prism 14 as intensity distribution shaping means. That is, the shaping prism 14 diffuses the intensity distribution in its minor axis direction of the elliptical shape. The light beams having been thus shaped are converged on the optical disk 16 by the object lens 15. As to the optical disk 16, any type thereof is selectable among read-only type, direct-read-after-write type, rewritable type, and so on, according to each purpose.

The light beams reflected from the optical disk 16 (hereinafter, referred to as the reflected beams) trace the light paths from the diffracting element 12 to the optical disk 16 in a reverse order. Therefore, the shaping prism 14 allows the intensity distribution of the reflected beams to change in its shape from the substantially circular shape to the original elliptical shape. Through the collimating lens 13, the reflected beams enter to the diffracting element 12, where they are diffracted so as to be focused on a light-receiving face of the photodetector 17.

FIG. 1 shows the diffracting element 12, semiconductor laser 11 and photodetector 17 when they are seen from the positive side toward the negative side along the Z-axis as is indicated by arrows I—I in FIG. 2. On the diffracting element 12, there is an elliptical bright portion formed by the reflected beams directed thereto. Further, the diffracting element 12 is divided into two regions 12a and 12b by a division line $1_1$ parallel to the X-axis. The minor axis of the elliptical bright portion is parallel to the division line $1_1$, that is, the reference direction. The pitch of grating 12c formed in the region 12a is set to be greater than that of grating 12d formed in the region 12b. As a result, an angle of diffraction with respect to a reflected beam Pb directed to the region 12b is greater than an angle of diffraction with respect to another reflected beam Pa directed to the region 12a.

FIG. 3 shows a plan view of the photodetector 17. The photodetector 17 is divided into three photodetecting regions 17a, 17b and 17c by a division line $1_2$ parallel to the Y-axis and a division line $1_3$ which is extended from a middle point of the division line $1_2$ in the positive direction of the X-axis. As shown in FIG. 1, when there is no occurrence of focus error, the reflected beam Pa diffracted by the region 12a of the diffracting element 12 is focused on a substantial center of the photodetecting region 17a to form a light spot Pa'. On the other hand, the reflected beam Pb diffracted by the region 12b is focused on a substantial middle point of the division line $1_3$ separating the photodetecting regions 17b and 17c to form a light spot Pb'.

Suppose that detection signals released from the photodetecting regions 17a, 17b and 17c are represented respectively as Sa, Sb and Sc. Then, a reproduction signal RF, a focus error signal FES and a radial (tracking) error signal RES by the use of the push-pull method are respectively obtained by calculations according to the following equations (1) to (3):

$$RF = Sa + Sb + Sc \qquad (1)$$

$$FES = Sc - Sb \qquad (2)$$

$$RES = Sa - (Sb + Sc) \qquad (3)$$

The object lens 15 is controlled through a focus driving system and a radial driving system (not shown) so that each of the values of FES and RES may equal "0".

The optical pickup device which is arranged so that the minor axis of an elliptical bright portion formed on the diffracting element 12 by reflected beams may coincide with the division line $1_1$, as described above, has the following advantages. For example, in the case where the optical disk 16 is fluctuated to move away from a focal point of the object lens 15, there is formed a line-like bright portion on the diffracting element 12 due to the astigmatism of the shaping prism 14 (shown by a heavy line P in FIG. 1). However, with the advantageous arrangement that the line-like bright portion P is formed so as to be orthogonal to the division line $1_1$, even if the division line $1_1$ slightly tilts with respect to the X-axis, or slightly deviates from the optical axis, those factors have little adverse effects on the requirement that the bright portion P should be evenly allotted onto the regions 12a and 12b. Therefore, even if a bright portion P having a line-like shape is formed on the diffracting element 12, an appropriate focus error signal FES can be obtained.

Furthermore, it is avoidable to have the phenomenon that a light spot Pb' is first formed either on the photodetecting region 17b or on 17c, and then formed on the other region in an inverted shape as the optical disk 16 further moves away from the focal point of the object lens 15. In other words, the focus error signal FES is little adversely affected by the fluctuation of the optical disk 16.

In the above arrangement, a zero-cross point of the FES curve (which shows the variation of intensity of the focus error signal FES with the amount of displacement of the optical disk 16) appears only in a state where the optical disk 16 is positioned at the focal point of the object lens 15 (which state is hereinafter referred to as the just-in-focus state), thereby permitting focus error control to be appropriately performed. As a result, a stable and preferable recording or reproducing operation is achieved. Moreover, since alleviated tolerances are available for the installation position of the division line $1_1$ with respect to the X-axis and Z-axis, the installation work for the diffracting element 12 is simplified.

Figure 4:
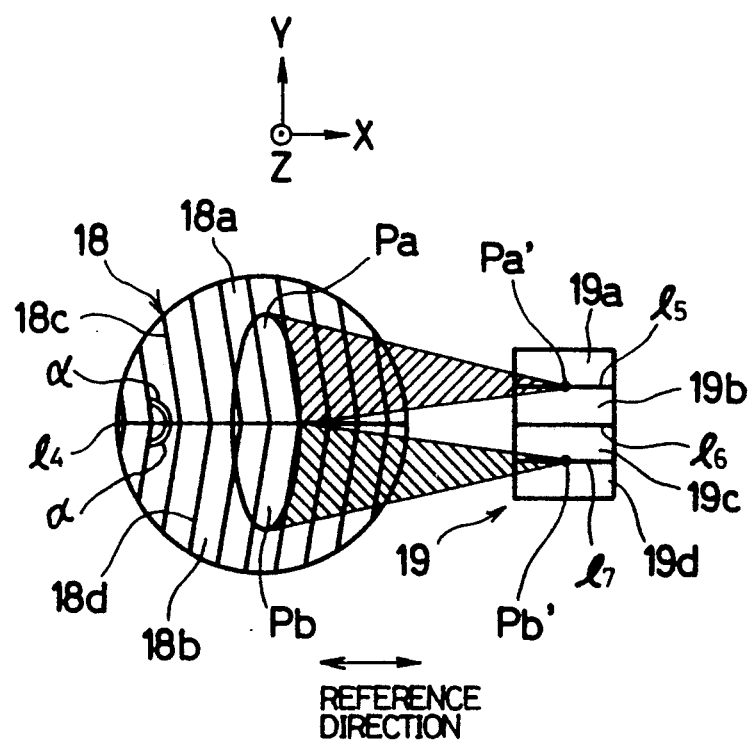
FIG. 4 is a schematic plan view showing a diffracting element and a photodetector of another embodiment in accordance with the present invention.

Referring to FIG. 4, the following description will discuss a second embodiment.

As with the first embodiment, a diffracting element 18 is divided into two regions 18a and 18b by a division line $1_4$ parallel to the X-axis. However, gratings 18c and 18d formed in the respective regions 18a and 18b are not orthogonal to the division line $1_4$ but slightly tilted with respect thereto. Each of the gratings 18c and 18d makes the same obtuse angle α with respect to the X-axis in the positive direction. Additionally, as with the first embodiment, the minor axis of an elliptical bright portion formed on the diffracting element 18 is set to be parallel to the X-axis, that is, the reference direction.

Figure 6:
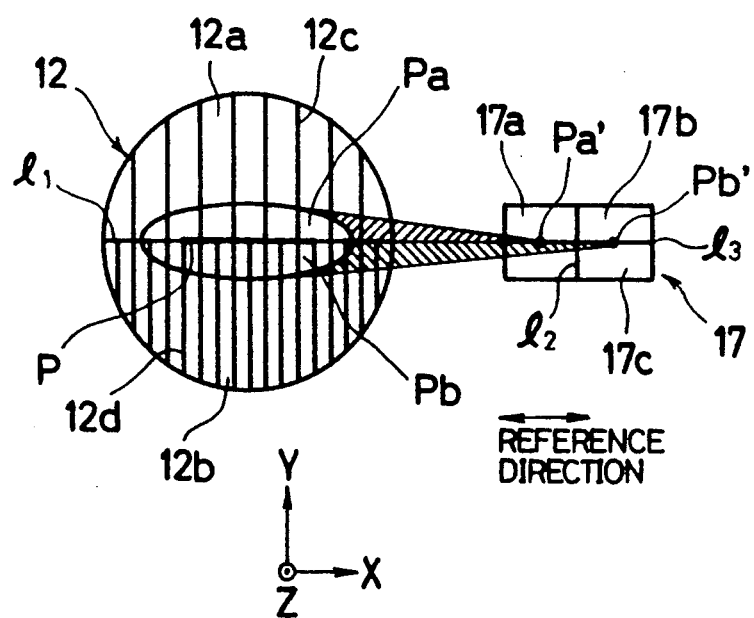
Figure 7:
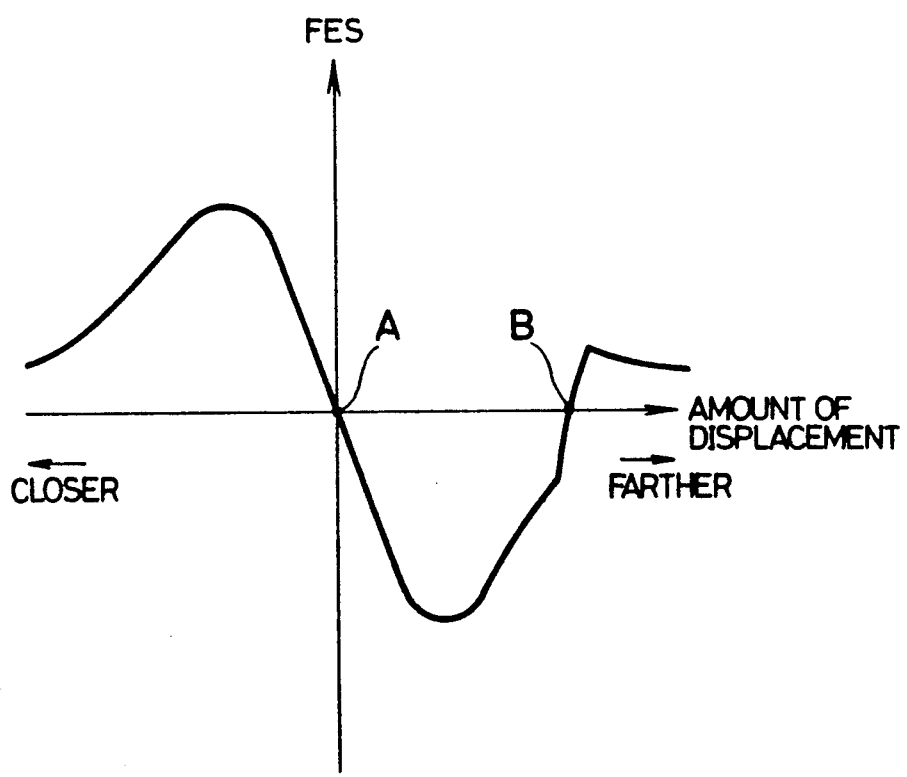
FIG. 7 is a graph showing the relationship between the amount of displacement of the recording medium based on a focal point of a object lens as a reference and the variation of intensity of a focus error signal.

On the other hand, a photodetector 19 is divided into four photodetecting regions 19a, 19b, 19c and 19d by three division lines $1_5$, $1_6$ and $1_7$, each of which is substantially parallel to the division line $1_4$ (e.g., see pages 162 and 163 together with FIG. 6 of "CD Optical Pickup using a Computer Generated Holographic Optical element" in Optical Storage and Scanning Technology, TonyWilson, Editor, Proc. SPIE 1139, p161-168, (989) by Yukio Kurata, et al.) Thus, reflected beams directed from the optical disk 16 are diffracted by the respective regions 18a, 18b of the diffracting element 18 to form respective light spots Pa' and Pb' on the photodetector 19. In this case, the installation position of the photodetector 19 is determined as follows:

(a) The division line $1_6$ is positioned within a plane containing both the Z-axis and the division line $1_4$.

(b) In the case of no focus error, the light spots Pa' and Pb' are formed respectively on the division lines $1_5$ and $1_7$.

Additionally, the arrangement is the same as that of the first embodiment except the diffracting element 18 and the photodetector 19.

In the second embodiment, when detection signals released from the photodetecting regions 19a, 19b, 19c and 19d are represented respectively as Sa, Sb, Sc and Sd, a reproduction signal RF, a focus error signal FES and a radial error signal RES by the use of the push-pull method are obtained by respective calculations according to the following equations:

$$RF = Sa + Sb + Sc + Sd \quad (4)$$

$$FES = (Sa - Sb) + (Sd - Sc) \quad (5)$$

$$RES = (Sa + Sb) - (Sc + Sd) \quad (6)$$

In this embodiment, there is no appearance of a zero-cross point in the FES curve in any state except in the just-in-focus state.

The following description will discuss a third embodiment. In addition, for convenience of explanation, those of the members having the same configurations and described in the first embodiment are indicated by the same reference numerals and the description thereof is omitted.

Figure 5:
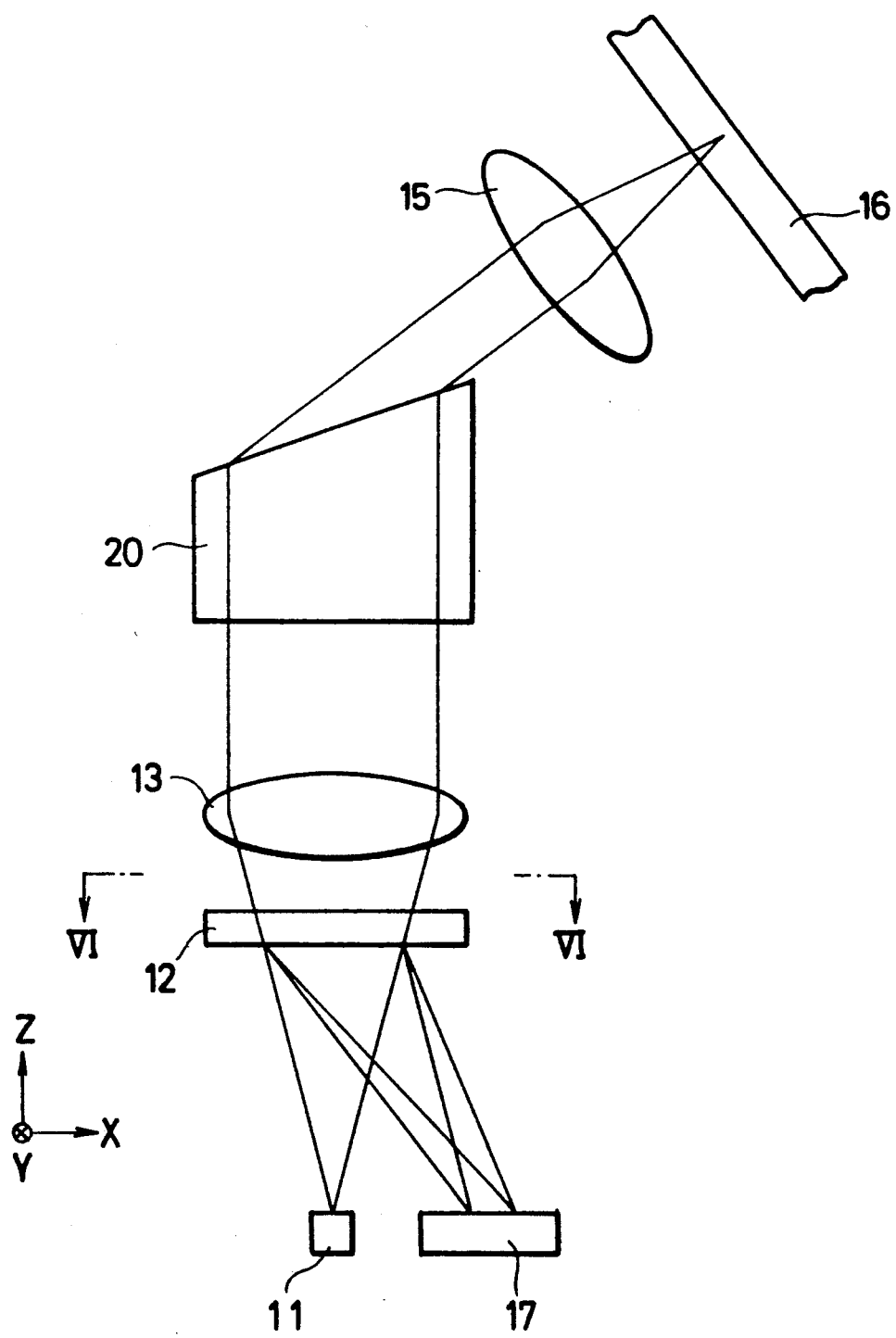
FIGS. 5 and 6 show the other embodiment of the present invention.

The semiconductor laser 11 of FIG. 5 projects light beams whose intensity distribution has an elliptical shape with its major axis parallel to the X-axis, that is, the reference direction, and its minor axis parallel to the Y-axis, having a reversed disposition to the above two embodiments. Further, a shaping prism 20 is designed to cause the intensity distribution of the elliptical shape to be condensed with respect to the major axis direction, that is, the reference direction. With the arrangement, the intensity distribution of the light beams is changed in its shape from the elliptical one to a substantially circular one. Moreover, the shaping prism 20, after having received reflected beams from the optical disk 16, diffuses their intensity distribution with respect to the major axis. Thus, the intensity distribution of the reflected beams is changed from its substantially circular shape to a substantially elliptical shape. Consequently, as shown in FIG. 6, a bright portion which is formed by the reflected beams illuminating the diffracting element 12 in the just-in-focus state, has an elliptical shape whose major axis is parallel to the X-axis, that is, the reference direction, and coincides with the division line $1_1$.

As shown in FIG. 6, the diffracting element 12 and the photodetector 17 have the same configurations as those of the first embodiment. Therefore, a reflected beam Pa diffracted by the region 12a of the diffracting element 12 in the just-in-focus state forms a light spot Pa' in a substantial center of the photodetector 17a. On the other hand, a reflected beam Pb diffracted by the region 12b forms a light spot Pb' at a substantial middle point of the division line $1_3$.

As described above, the shaping prism 20 of the third embodiment has a shaping function on the intensity distribution of the light beams from the semiconductor laser 11 and the reflected beams from the optical disk 16 in the direction of the major axis, but has no effects on the intensity distribution in the direction of the minor axis. Therefore, in the case where the optical disk 16 is fluctuated to move away from a focal point of the object lens 15, the shaping prism 20 has no bearing on the focal distances of the reflected beams with respect to the minor-axis direction, although it has bearing on that the focal distances are extended with respect to the major-axis direction.

In this respect, it is noted that the reflected beams form a substantially line-like bright portion such as shown by a heavy line P on the diffracting element 12 only in the case where the optical disk 16 is fluctuated to move away from the focal point to a great extent. In this case, the displacement of the optical disk 16 reaches, for example, substantial several millimeters, and becomes too great to be included within a control range of focus errors. In other words, when taking account of the control range of focus errors, there is virtually no zero-cross point existing in the FES curve within the range except one appearing in the just-in-focus state.

Consequently, as with the other embodiments described above, an optical pickup device of the third embodiment provides stable focusing control, and makes it possible to perform a preferable recording or reproducing operation.

Additionally, the third embodiment shows the arrangement wherein the major axis of the elliptical bright portion formed on the diffracting element 12 coincides with the division line $1_1$; yet, another arrangement may be adopted, wherein the minor axis thereof coincides with the division line $1_1$. In either case, it is important to adopt the arrangement wherein the shaping prism 20 functions to shape the intensity distribution with respect to the major axis direction.

As described above, the optical pickup device of the present invention includes diffraction means whose diffraction face is divided by division lines parallel to the reference direction and photodetecting means whose light-receiving face is divided by division lines substantially parallel to the reference direction. Thus, the reflected beams from the recording medium form on the diffraction face an elliptical bright portion whose major axis is orthogonal to the reference direction. With the arrangement, there is no appearance of a zero-cross point in the focus error signal even if the bright portion on the diffraction face becomes to have a substantially line-like shape. Therefore, the detection of focus errors can be performed accurately and positively.

Moreover, the optical pickup device of the present invention may include intensity distribution shaping means which condenses the intensity distribution of light whose intensity distribution has an substantially elliptical shape, with respect to the direction of the major axis. In this case, reflected beams from the recording medium are arranged to form on the diffraction face an elliptical bright portion with its minor axis orthogonal to the reference direction. With this arrangement, it is avoidable that the bright portion on the diffraction face becomes to have a line-like shape within a normal fluctuation range of the position of the recording medium. Consequently, since there is virtually no appearance of a zero-cross point in the focus error signal, the detection of focus errors can be performed accurately and positively.

The invention being thus described, it may be obvious that the same may be varied in many ways. Such variations are not to be regarded as a departure from the scope of the invention.

There are described above novel features which the skilled artisan will appreciate give rise to advantages. These are each independent aspects of the invention to be covered by the present application, irrespective of whether or not they are included within the scope of the following claims.

What is claimed is:

1. An optical pickup device comprising:

light generation means for generating light having intensity distribution showing a substantially elliptical shape in a cross section orthogonal to an optical axis, a minor axis of the elliptical shape being parallel to a reference direction;

intensity distribution shaping means for diffusing the elliptical intensity distribution of the light with respect to the minor axis to form a substantially circular shape, the light being directed on a recording track formed on a recording medium, and condensing the circular intensity distribution of light reflected from the recording track to restore its substantially elliptical shape;

photodetecting means for generating detection signals so as to obtain a focus error signal, the photodetecting means including a plurality of photodetecting regions formed by a plurality of division lines dividing a light-receiving face thereof, the detection signals being released by the respective photodetecting regions according to the intensity of the light entered thereto, at least one of the plurality of division lines being substantially parallel to the reference direction, a hypothetical line extending through a projecting point of the light generation means and the center of the light-receiving face being parallel to the reference direction; and diffraction means for diffracting the reflected light which has passed through the intensity distribution shaping means so as to converge the reflected light on a light-receiving face of the photodetecting means, the diffraction means including a plurality of diffraction regions formed by a plurality of division lines dividing a diffraction face, at least one of the plurality of division lines for dividing the diffraction face being parallel to the reference direction, whereby a value of the focus error signal is zero when the reflected light that has been diffracted by at least one of the diffraction regions of the diffraction means is converged on at least one of the division lines in the photodetecting means, which is substantially parallel to the reference direction.

2. An optical pickup device comprising:

light generation means for generating light having intensity distribution showing a substantially elliptical shape in a cross section orthogonal to an optical axis, a major axis or a minor axis of the elliptical shape being parallel to a reference direction;

intensity distribution shaping means for condensing the elliptical intensity distribution of the light with respect to the major axis to form a substantially circular shape, the light being directed on a recording track formed on a recording medium, and condensing the circular intensity distribution of light reflected from the recording track to restore its substantially elliptical shape;

photodetecting means for generating detection signals so as to obtain a focus error signal, the photodetecting means including a plurality of photodetecting regions formed by a plurality of division lines dividing a light-receiving face thereof, the detection signals being released by the respective photodetecting regions according to the intensity of the light entered thereto, at least one of the plurality of division lines being substantially parallel to the reference direction, a hypothetical line extending through a projecting point of the light generation means and the center of the light-receiving face being parallel to the reference direction; and diffraction means for diffracting the reflected light which has passed through the intensity distribution shaping means and directed on a plurality of diffraction regions so as to converge the reflected light on a light-receiving face of the photodetecting means, the diffraction means including a plurality of diffraction regions formed by a plurality of division lines dividing a diffraction face, at least one of the plurality of division lines for dividing the diffraction face being parallel to the reference direction, whereby a value of the focus error signal is zero when the reflected light that has been diffracted by at least one of the diffraction regions of the diffraction means is converged on at least one of the division lines in the photodetecting means, which is parallel to the reference direction.

3. An optical pickup device as set forth in claim 1 or claim 2, wherein a tangent direction of the track whereon light is converged for recording or reproduction is contained within a plane containing the optical axis and the reference direction.

4. An optical pickup device as set forth in claim 1 or claim 2, further comprising parallel light beam forming means for allowing the light projected from the light generation means and transmitted through the diffraction means to form a parallel pencil of light beams so as to be directed to the intensity distribution shaping means.

5. An optical pickup device as set forth in claim 1 or claim 2, further comprising converging means for converging on the recording track of the recording medium the light whose intensity distribution is shaped into a circular shape by the intensity distribution shaping means.

6. An optical pickup device as set forth in claim 1 or claim 2, wherein the diffraction means includes at least two diffraction regions formed by at least one division line parallel to the reference direction, the diffraction regions being provided with respective gratings whose pitch is different from each other; and the photodetecting means includes a first photodetecting region and a second photodetecting region formed by a first division line that are contained within the light-receiving face and orthogonal to the reference direction, the second photodetecting region being provided with a third photodetecting region and a fourth photodetecting region formed by a second division line extending from a middle point of the first division line substantially in parallel with the reference direction, whereby a value of the focus error signal is zero when a part of the reflected light having been diffracted by at least one of the diffraction regions of the diffraction means is converged on the second division line in the photodetecting means.

7. An optical pickup device as set forth in claim 6, wherein the diffraction means includes two diffraction regions formed by one division line substantially parallel to the reference direction such that a part of the reflected light diffracted by one of the diffraction regions is converged on the second division line in the photodetecting means and the other part of the reflected light diffracted by the other of the diffraction regions is converged onto a vicinity of a center of the first photodetecting region, whereby, when a detection signal released from a first photodetecting region is represented as Sa; a detection signal released from the third photodetecting region is represented as Sb; and a detection signal released from the fourth photodetecting region is represented as Sc, a reproduction signal of information recorded on the recording medium is obtained by a calculation of $Sa+Sb+Sc$; the focus error signal is obtained by a calculation of $Sc-Sb$; and a tracking error signal is obtained by a calculation of $Sa-(Sb+Sc)$.

8. An optical pickup device as set forth in claim 1 or claim 2, wherein the diffraction means includes at least two diffraction regions formed by at least one division line parallel to the reference direction, the diffraction regions being provided with respective gratings whose pitch is different from each other; and the photodetecting means includes a first through fourth photodetecting regions formed by a first through third division lines that are contained within the light-receiving face and substantially parallel to the reference direction, whereby a value of the focus error signal is zero when a part of reflected light having been diffracted by one of the diffraction regions is converged on the first division line separating the first and the second photodetecting regions, and further another part of the reflected light having been diffracted by another of the diffraction regions is converged on a third division line separating the third and fourth photodetecting regions.

9. An optical pickup device as set forth in claim 8, wherein the diffraction means includes two diffraction regions formed by one division line parallel to the reference direction such that a part of reflected light diffracted by one of the diffraction regions is converged on the first division line separating the first and second photodetecting regions and further the other part of the reflected light diffracted by the other of the diffraction regions is converged on the third division line separating the third and fourth photodetecting regions, whereby, when a detection signal released from a first photodetecting region is represented as Sa; a detection signal released from a second photodetecting region is represented as Sb; a detection signal released from a third photodetecting region is represented as Sc; and a detection signal released from a fourth photodetecting region is represented as Sd, a reproduction signal of information recorded on the recording medium is obtained by a calculation of $Sa+Sb+Sc+Sd$; the focus error signal is obtained by a calculation of $(Sa-Sb)+(Sd-Sc)$; and a tracking error signal is obtained by a calculation of $(Sa+Sb)-(Sd+Sc)$.

* * * * *